US010153838B1

(12) United States Patent
Hunwardsen et al.

(10) Patent No.: US 10,153,838 B1
(45) Date of Patent: Dec. 11, 2018

(54) QUAD TRACKER WITH BIREFRINGENT OPTICS (71) Applicant: Facebook, Inc., Menlo Park, CA (US)

(72) Inventors: Matthew Thomas Hunwardsen, Simi Valley, CA (US); Harvard K. Harding, Jr., Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/393,191

(22) Filed: Dec. 28, 2016

(51) Int. Cl.
G02F 1/01 (2006.01)
H04B 10/116 (2013.01)
G01J 1/02 (2006.01)
G01J 1/04 (2006.01)
G02B 1/08 (2006.01)

(52) U.S. Cl.
CPC .......... H04B 10/116 (2013.01); G01J 1/0266 (2013.01); G01J 1/0411 (2013.01); G01J 1/0429 (2013.01); G02B 1/08 (2013.01)

(58) Field of Classification Search
CPC ... H04B 10/116; H04B 10/1141; H04B 10/11; H04B 10/114; H04B 10/502; H04B 10/80; H04B 10/1121; H04B 10/112; H04B 10/503; H04B 10/807; G02B 1/08; G02B 5/3083; G02B 1/041; G02B 1/14; G02B 19/0028; G02B 5/30; G01J 1/0411; G01J 1/0266; G01J 1/0429; G01J 1/04; G01J 1/4228; G01J 1/0437; G01J 1/4257; G01J 1/0414; G01J 1/0448; G01J 5/0806; G01J 4/04; G01J 3/0289; G01J 4/00; G01J 5/0825; G01J 3/0224; G01J 3/021; G01J 5/0809; G01J 2001/448; G01J 2009/0261; G03F 7/70566; G03F 7/70966; G03F 7/70241; G03F 7/70191; G02C 7/12; G02C 2202/16
See application file for complete search history.

(56) References Cited

U.S. PATENT DOCUMENTS 3,520,592 A * 7/1970 Eng ...................... G02B 5/3083
                                                            359/484.02
3,562,537 A    2/1971 Miller
5,148,010 A * 9/1992 Mori ......................... G02F 1/29
                                                              250/201.5

(Continued)

OTHER PUBLICATIONS http://www.roditi.com/Laser/Birefringent/intro.html.*
(Continued)

Primary Examiner — Mohamed K Amara
(74) Attorney, Agent, or Firm — FisherBroyles, LLP (57) ABSTRACT An optical tracking system for use in a free space optical communication system is described. The system includes a birefringent lens that is positioned to receive incident light and to produce light with a first and a second polarization. The system also includes a focusing lens positioned to receive the light with the first and the second polarizations and to direct the light with the first polarization to a first focal location along the optical axis and the light with the second polarization to a second focal location along the optical axis. A quadrature detector that is positioned between the first focal location and the second focal location receives the light with both the first and the second polarizations, and produces an output that is indicative of an alignment of the optical system.

20 Claims, 10 Drawing Sheets

(56) References Cited

U.S. PATENT DOCUMENTS

| | | | |
|---|---|---|---|
| 5,841,745 A | 11/1998 | Kuhn et al. | |
| 6,008,947 A * | 12/1999 | Togino | G02B 27/0172 359/630 |
| 9,188,543 B2 * | 11/2015 | Li | G01N 21/8806 |
| 2002/0171825 A1 * | 11/2002 | Krantz | G01N 21/95607 356/237.1 |
| 2005/0031245 A1 * | 2/2005 | Law | G01J 4/00 385/11 |
| 2005/0094267 A1 * | 5/2005 | Huber | G02B 27/26 359/464 |
| 2007/0035672 A1 * | 2/2007 | Shestak | G02B 27/2214 349/15 |
| 2007/0242329 A1 * | 10/2007 | Ballegaard | G02B 26/123 359/202.1 |
| 2009/0040610 A1 * | 2/2009 | Stallinga | G03F 7/70566 359/489.01 |
| 2009/0168613 A1 * | 7/2009 | Sirat | G02B 1/02 369/18 |
| 2011/0079703 A1 | 4/2011 | Gunning, III et al. | |
| 2011/0242490 A1 * | 10/2011 | Itoh | G02B 27/1026 353/8 |
| 2013/0070239 A1 | 3/2013 | Crawford et al. | |
| 2013/0083386 A1 * | 4/2013 | Harding | G01N 21/21 359/240 |
| 2014/0009757 A1 * | 1/2014 | Bodkin | G01J 4/04 356/300 |
| 2014/0055749 A1 * | 2/2014 | Zhou | A61B 3/0025 351/214 |
| 2016/0047956 A1 * | 2/2016 | Tabirian | G02C 7/022 385/11 |
| 2017/0242398 A1 * | 8/2017 | Brooker | G02B 21/0056 |
| 2017/0293155 A1 * | 10/2017 | Saracco | G02B 27/48 |
| 2018/0084245 A1 * | 3/2018 | Lapstun | G02B 6/32 |
| 2018/0139365 A1 * | 5/2018 | Kanamori | G02B 27/283 |

OTHER PUBLICATIONS https://www.researchgate.net/post/What_is_the_advantage_of_using_Plano-Convex_Lens_for_Focusing_Lasers_over_Bi-Convex_Lens.*

Eng et al. ("Multiple Imagery with birefringent lenses", Appl. Opt., 8, Oct. 10, 1969.*

* cited by examiner

Dimensions in Millimeters

| Left Surface | Material | Right Surface |
|---|---|---|
| R 86.6385 CX<br>ØE14<br>Ⓐ<br>3/ -<br>4/ -<br>5/ -<br>6/ - | GLASS: YVO4<br>N(1.55 m) = 1.944729<br>V -<br>0/ -<br>1/ -<br>2/ - | R PLANO<br>ØE14<br>Ⓐ 3/ -<br>4/ -<br>5/ -<br>6/ - |

QUAD TRACKER WITH BIREFRINGENT OPTICS

TECHNICAL FIELD

The subject matter of this patent document generally relates tracking of optical signals and, more specifically, to a quadrature tracker in an optical system that uses a birefringent component.

BACKGROUND

Wireless communication systems transfer data from a transmitter of one station to a receiver of another station. In some applications, one of the stations can be ground based (e.g., stationary) while the other station is carried by a flying vehicle (e.g., a satellite in Earth's orbit, an airplane or an unmanned aerial vehicle (UAV)). Furthermore, multiple stations can be ground based and in communication with one or more flying objects, or both stations can be part of flying vehicles. These wireless communication systems are sometimes used for Internet connections, especially if the land-based network is underdeveloped. These ground/airborne communication systems have to uplink (UL) and downlink (DL) large and ever-increasing volumes of data. Such large volumes of data form today's complex telecommunication devices and networks, and are fast outpacing bandwidth offered by today's satellite communications technology. Airborne vehicles typically communicate with other airborne or ground-based stations using microwave or radiofrequency (RF) bands. However, a major challenge for conventional microwave and RF communications is the highly constrained spectrum allocation imposed on these communication bands.

Free-space optical (laser) communications (FSO or Lasercom) is immune to spectrum allocation due to virtually unlimited bandwidth of the optical regions (greater than 100 Tb/s). While experimental FSO technology is now available for downlinking data at 100's of Gb/s from air or space, these solutions are complex and expensive, require relatively large components and consume large amounts of power. One of the challenges associated with free space optical communications is the ability to maintain a proper alignment between a receiver of the optical beam that is subject to atmospheric turbulence. Such alignment issues are further complicated when one or both of the receiver and transmitter are moving.

DETAILED DESCRIPTION

The disclosed embodiments facilitate generation of an accurate tracking signal for a free space optical communication system that utilizes a birefringent component. One aspect of the disclosed embodiments relates to an optical system for tracking incident light in a free space optical communication system. Such an optical system includes a lens comprising a birefringent material that is positioned on an optical axis to receive the incident light and to produce light with a first and a second polarization. The optical system also includes a focusing lens positioned on the optical axis to receive the light with the first and the second polarizations and direct the light with the first polarization to a first focal location along the optical axis, and to direct the light with the second polarization to a second focal location along the optical axis. The optical system further includes a quadrature detector positioned between the first focal location and the second focal location to receive the light with the first and the second polarizations subsequent to exiting the focusing lens. The quadrature detector is configured to produce an output signal or voltage indicative of an alignment of the optical system with the incident light received at the optical system.

In some embodiments, the lens comprises birefringent material that includes Yttrium Vanadate ($YVO_4$). In some embodiments, the birefringent lens is a plano-convex lens, where the plane surface of the birefringent lens directly faces the focusing lens. In some embodiments, the birefringent lens has an f-number of six and a diameter of 14 millimeters. As is well known, f-number is the ratio of the lens's focal length to the diameter of its entrance pupil. In some embodiments, the convex surface of the birefringent lens has a radius of curvature of approximately 86 millimeters.

In some embodiments, the quadrature detector is positioned at a midpoint between the first and the second focal locations. In some embodiments, the birefringent lens is shaped to correct an aberration of the optical system. In some embodiments, the incident light received at the optical system comprises laser light having propagated through a part of earth's atmosphere. In some embodiments, the optical system further includes an electronic circuit coupled to the quadrature detector to receive the output of the quadrature detector and is configured to produce a tracking signal based on a detected intensity of the light that is incident on the quadrature detector. In some embodiments, the tracking signal is produced based on a centroid of the detected intensity of the light that is incident of the quadrature detector. In some embodiments, the tracking signal is a feedback signal that enables adjustment of the optical system's alignment with respect to the incident light received at the optical system. In some embodiments, the incident light is un-polarized laser light.

Another aspect of the disclosed embodiments relates to a method for producing a tracking signal in a free space optical communication system. The method includes receiving light at a quadrature detector that is positioned midway between a first and a second focal plane. The first and the second focal planes correspond to locations where light of a first and a second polarizations, respectively, comes to focus. The light of the first and the second polarizations having been produced by a lens comprising a birefringent material that receives an incident beam of light, causes light of the first and the second polarizations to exit the lens and enter a focusing lens. The focusing lens directs the light of the first and second polarizations to the first and the second focal planes, respectively. The above noted method for producing a tracking signal further includes generating a tracking signal in response to the received light at the quadrature detector.

Another aspect of the disclosed embodiments relates to an optical detection system that includes a lens comprising a birefringent material and positioned to receive light on a first surface of the lens and produce light with a first polarization and a second polarization upon propagation of the light through the birefringent material and upon exit from a second surface of the lens. The above optical detection system further includes a quadrature detector positioned to simultaneously receive the light with the first polarization and the second polarization on one or more quadrants of the quadrature detector. The quadrature detector is positioned such that an intensity of the light that impinges on the quadrature detector with the first polarization is equal to intensity of the light that impinges on the quadrature light with the second polarization.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Figure 1:
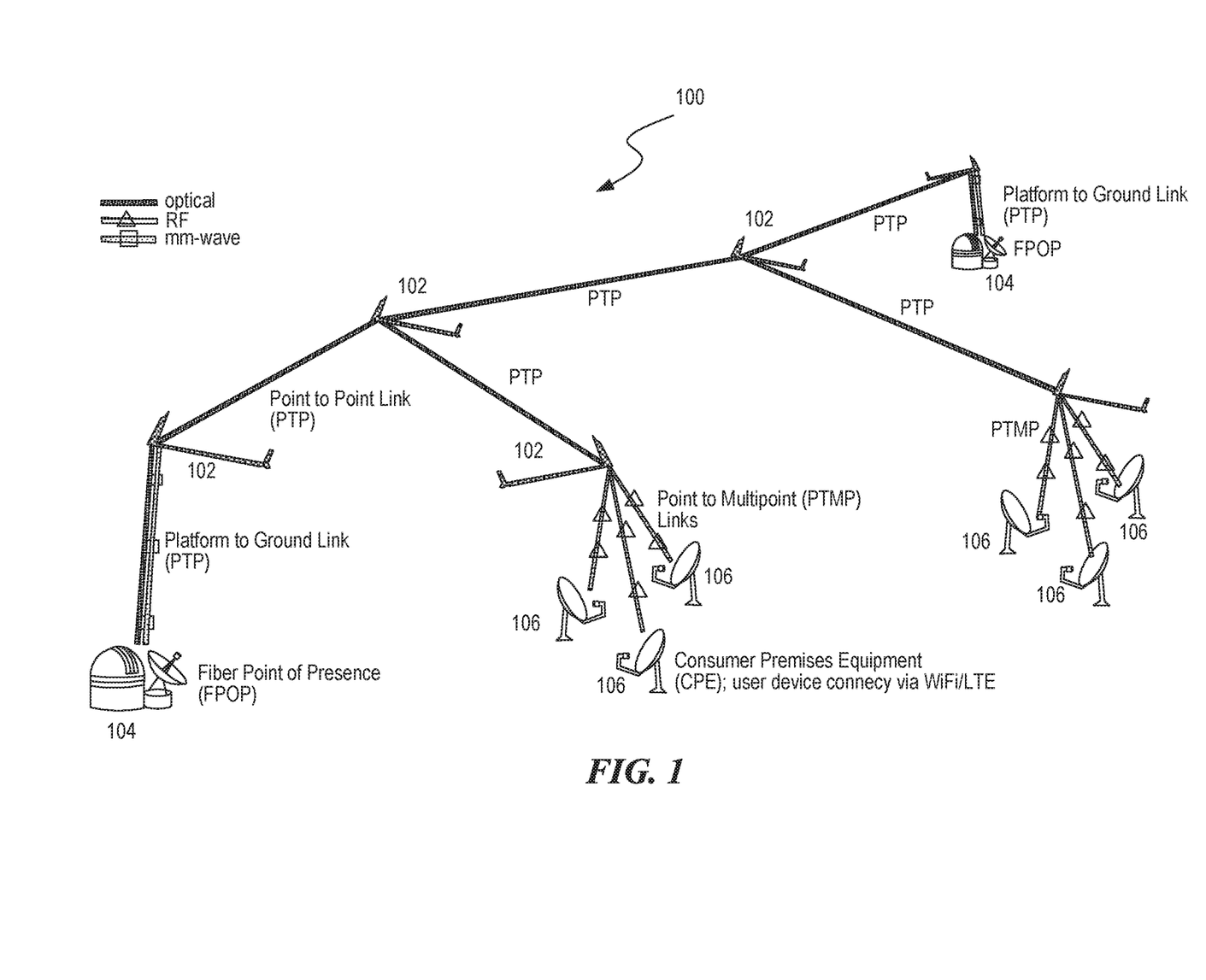
FIG. 1 is a block diagram illustrating a free space communication system within which the disclosed embodiment can be implemented.

Turning now to figures, FIG. 1 is a block diagram illustrating a free space communication system 100 that uses a variety of optical, RF and mm-wave communication links. The communication links in FIG. 1 can be established among moving and stationary components, including aircraft 102 (e.g., UAVs) and ground-based stations 104, 106. One of the challenges in Lasercom is maintaining an accurate line of sight between the receiver and the transmitter, one or both of which may be in motion.

A quadrant detector (often shortened as "quad detector") is a photo detector with four active detector areas. These detectors have the ability to measure extremely small changes in the position of a light beam and are used for detecting and measuring position displacements of an optical beam in a variety of optical systems. Moreover, fast response times of quad detector sensors enable operation at high sampling rates of 100 KHz or higher. These properties of quad detectors make them suitable for use in free space laser communication systems that require precision tracking over large fields of view. The quad detectors further provide a considerable cost advantage over the more expensive focal plane arrays. These focal plane arrays include several detectors with smaller pixel sizes than quad detector, but are often much more expensive (e.g., $100K versus $200), are heavier, have a larger footprint (i.e., occupy a larger space), consume more power and are only capable of operating up to 10 KHz (which is about a factor of 10 slower than the desired 100 KHz operation for free space optical communication systems).

Figure 2:
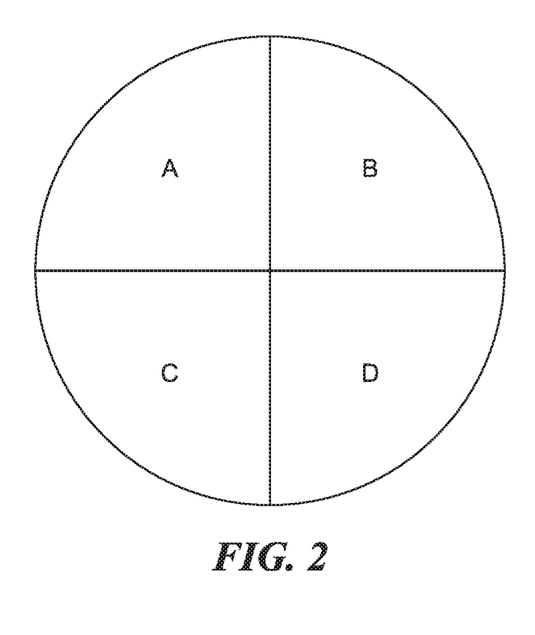
FIG. 2 is a simplified diagram of a quadrant detector.

FIG. 2 is a simplified diagram illustrating the four quadrants of a quad detector. A typical operation of the quad detector involves the following steps. When an incoming light beam impinges on the detector, the position of the centroid of the detected beam is determined based on signals from the four quadrants, A, B, C and D that are shown in FIG. 2. For example, the X and Y displacements can be obtained using the following equations:

$$X=[(A+D)-(B+C)]/[A+B+C+D],$$

$$Y=[(A+B)-(D+C)]/[A+B+C+D].$$

The optical components of the system that includes the quad detector are arranged so that the displacements of the spot in the X and Y directions can be mapped to an angular or lateral displacement of the incoming optical beam. When a quad detector is used in an optical tracking or alignment system, the detected displacement of the optical beam (e.g., the displacement of the centroid of the beam incident on the quad detector) is used as a feedback mechanism to reposition the system or its components to obtain the proper alignment. For example, in a system where a light beam is coupled into a fiber optic channel, the feedback signal from the quad detector can be used to maintain the position of the incoming optical beam at the center of the fiber optic channel.

An important factor in designing a system that uses a quad detector is the relationship between the spot size and the dimensions of the detector. For example, in diffraction-limited applications, where a spot size of a tightly focused beam is governed by approximately $\lambda/2NA$ ($\lambda$ is the wavelength of incident light and NA is the numerical aperture of the system), the size of the dead zones between the detector elements must be small enough to avoid significant loss of optical signal that may fall on the dead zones. In other applications where the spot size is larger than the size of the quad detector, some of the incident light may be truncated by the edges of the detector, resulting in an erroneous or inaccurate position signal.

As noted above, in some applications quad detectors are placed at the focal point of an optical system. Such an arrangement, however, may not be suitable for diffraction limited systems that also require a cost-effective, and yet accurate feedback mechanism that operates at high speeds. In particular, due to the small spot size at the focal point and existence of dead zones between the quad detectors, not all four quadrants may be illuminated at the same time, thus limiting the usefulness of the detected quad signals. Moreover, for a diffraction limited system with a spot size of $\lambda/2NA$ (which is often approximated as $\lambda/D$, where D is the diameter of the pupil or lens aperture that receives the light), the linear range of detection is also limited to $\lambda/D$. That is, when the spot is offset by more than $\lambda/D$, the entire spot may be detected by only one of the quadrants, which limits the useful information that is needed for re-centering the spot on the middle of the detector.

In some implementations, rather than placing the quad detector at focal plane of the optical system, the quad detector is positioned at a location ahead or behind the focal plane. In this arrangement, a larger (defocused) spot size is incident on the quad detector, which increases the linear range of the detector operation. That is, a larger displacement is required to move the spot entirely to one quadrant compared to the previous arrangement where the quad detector is positioned exactly at the focal plane. However, one of the drawbacks of such a defocused arrangement is that the tracking signal becomes more sensitive to the position in the pupil plane. Such a pupil plane can be the re-imaged entrance pupil of the optical system that is at the front of the optical system.

Figure 3A:
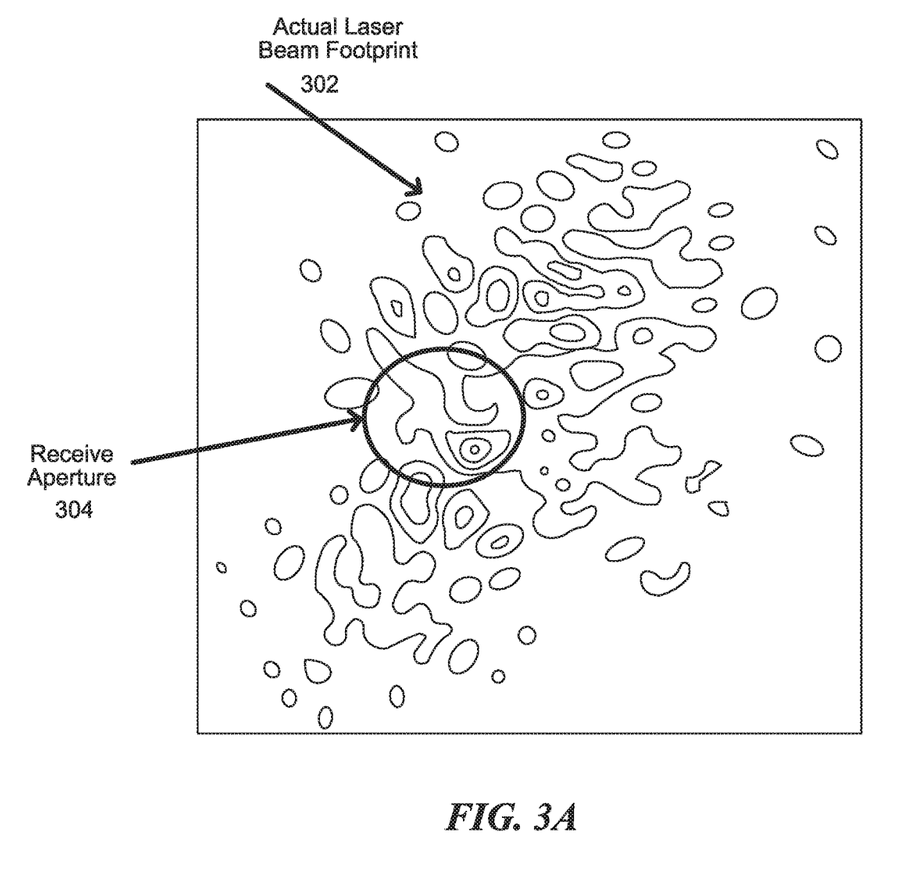
FIG. 3A is a signal diagram illustrating a simulated laser beam signal footprint at a receiver of a free space optical communication system.
Figure 3B:
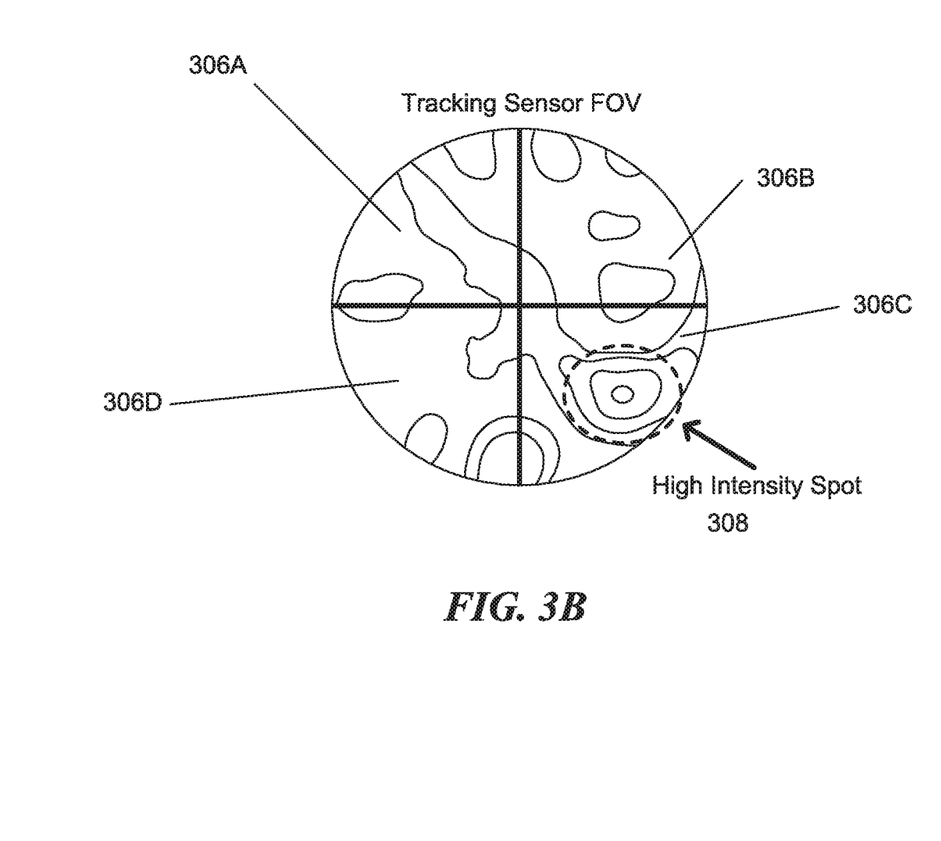
FIG. 3B is a signal diagram illustrating the optical signal received at a quadrant tracker corresponding to the receive aperture shown in FIG. 3A.
Figure 3C:
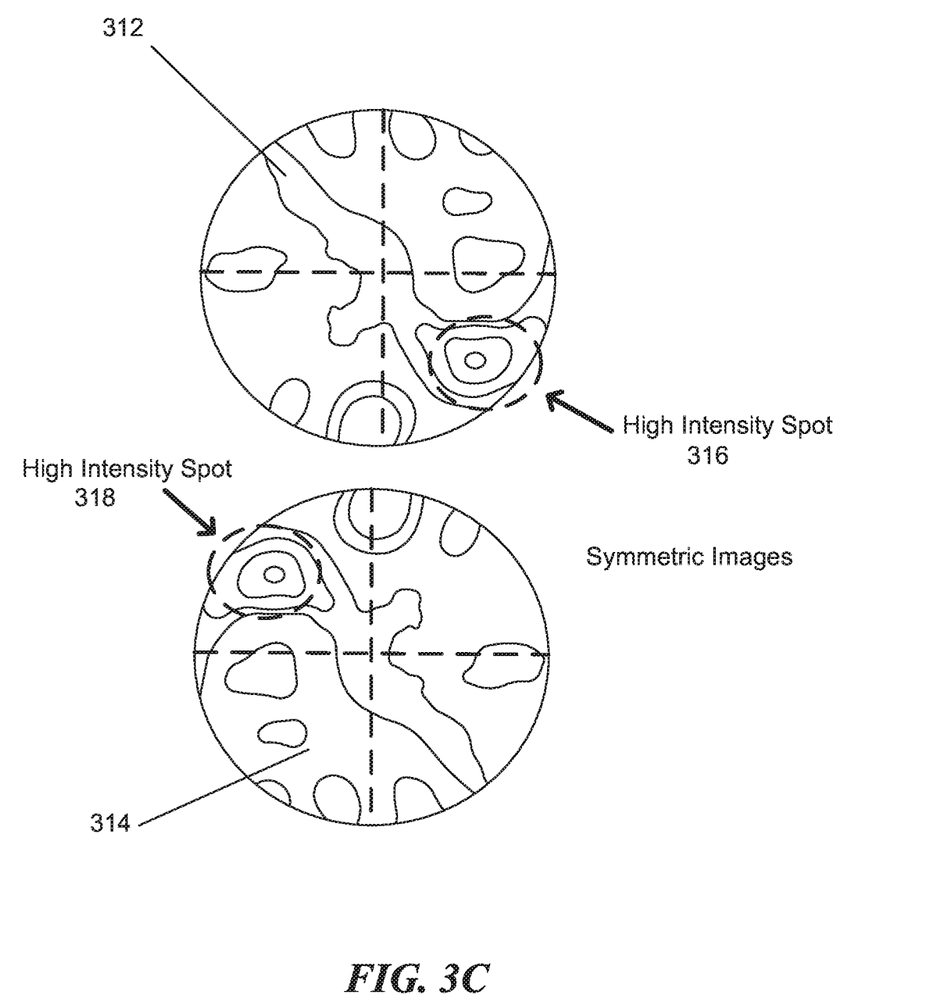
FIG. 3C is a signal diagram illustrating two symmetric images before and after focus positions corresponding to the receive aperture of FIG. 3A.

One solution to such a problem is to place two detectors, one before and one after the focal plane. FIGS. 3A, 3B and 3C are simulated signal diagrams that illustrate how such a two-detector system can produce an improved tracking signal. FIG. 3A illustrates a simulated laser beam footprint 302 that can be received at the entrance of a receiver, denoted as the Receive Aperture 304, in a free space optical communication system. Due to propagation of the laser beam through the atmosphere, the received laser beam profile includes variations due to destructive interference of photons that arrive at the receive aperture 304 after having traveled through different optical paths; these variation, however, are still coherent with respect to each other. FIG. 3B illustrates the optical signal within the field of view (FOV) of the tracking sensor (see also the Receive Aperture 304 shown in FIG. 3A that is received at the single quad detector, with four quadrants identified as 306A, 306B, 306C and 306D. As evident from FIG. 3B, the variations in intensity caused by atmospheric scintillation can cause a high intensity portion of the received beam to be incident on the lower right quadrant 306C, which results in erroneous detection of a misalignment in the optical system, although (as evident from FIG. 3A the Receive Aperture 304 is substantially centered with respect to the laser beam footprint. FIG. 3C illustrates two symmetric images 312, 314 corresponding to the same FOV as in FIG. 3A that can be obtained using two quad detectors placed before and after the focal plane, respectively. As shown in FIG. 3C, the high intensity spot 308 of FIG. 3B is now manifested at two high intensity spots 316, 318 located at opposite quadrants of the quad detectors. The symmetry in the high intensity spots 316, 318 is manifested by appearance of those spots at opposite quadrants. In one implementation, a tracking signal based on an average of the two centroids of the quad detectors can be produced, which more accurately provides a feedback control signal for alignment of the optical system.

Using two separate quad detectors for such an implementation, however, can have several disadvantages. Aside from the added cost and increased size due to requiring two separate detectors, additional calibration and alignment procedures must be carried out, which result in a more complex and less reliable detection system. Having a simple, compact and accurate detection system is especially important for implementations in airborne devices, such in UAVs, where both the power source (e.g., battery, fuel, etc.) and the real estate within the device are of a premium. For a UAV that is deployed in a rugged environment, it is also important to improve the reliability of the optical detection system, and to simplify maintenance and calibration procedures, which are often inversely proportional to the number of components that are used in such a system. The maintenance and calibration issues can be further exacerbated in a two-detector arrangement in which, in order to allow the light to reach the second detector, a beam splitter is often added to divert a portion of the incoming beam into a different direction and onto the second detector; thus once again adding to the cost and complexity of the detection system.

As a further illustration of the challenges faced by airborne vehicles, components that are deployed at high altitudes in a free space optical communication system (e.g., in a UAV) are often subject to extreme temperature excursions of about 100° C. Maintaining the proper alignment of components under such extreme ranges of temperature is a challenging task; such a task becomes even more difficult when the number of components is increased. Moreover, due to the requirement for additional sensors and components, conducting multiple calibration procedures for UAV subsystems may not be feasible or even possible. Therefore, it is highly desirable to design optical tracking systems that do not require post-deployment calibration procedures.

Figure 4:
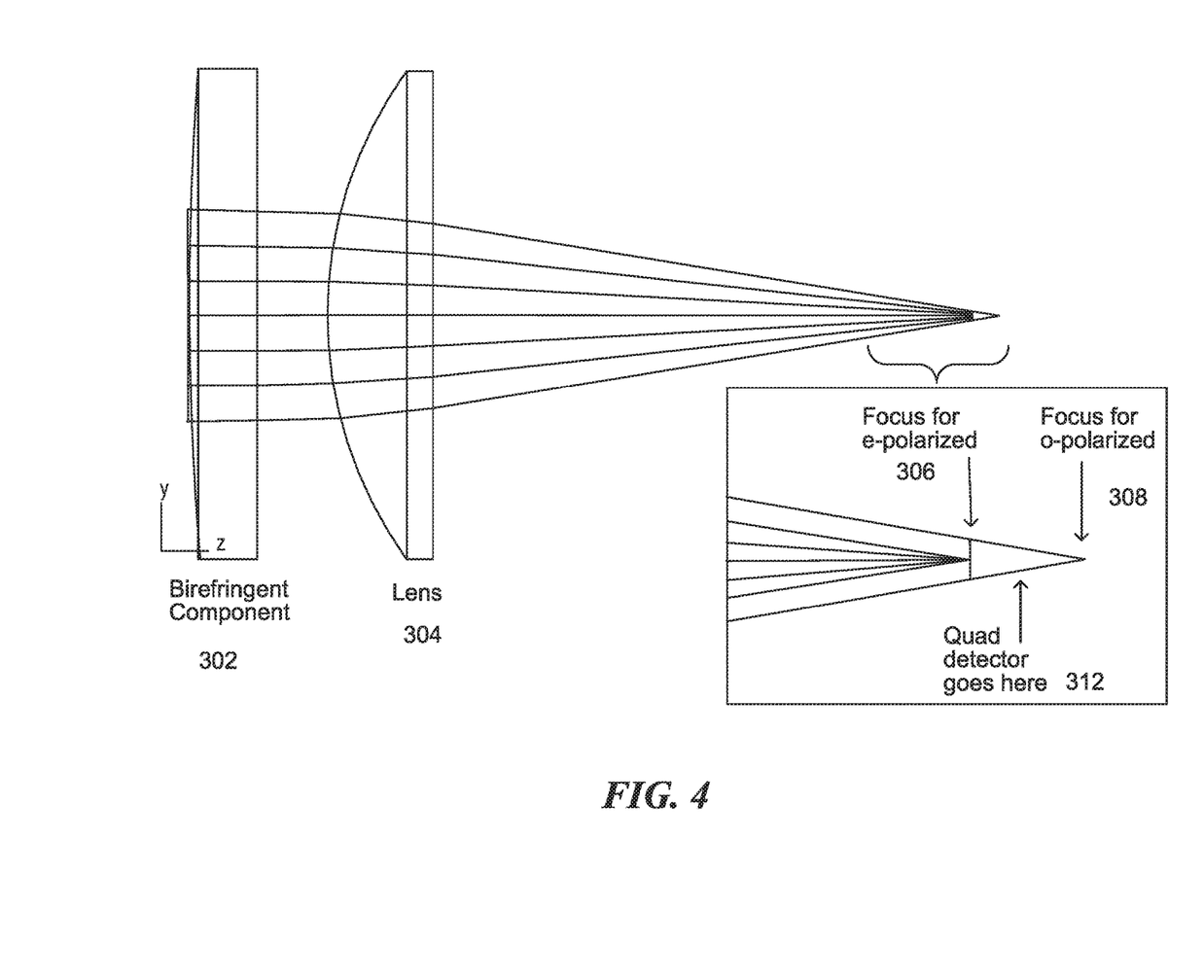
FIG. 4 is a lens diagram illustrating an optical tracking system that uses a birefringent optical component in accordance with an example embodiment.

The disclosed embodiments relate to a compact and reliable optical tracking system that can accurately provide the required signal tracking capabilities. In some embodiments, a component that includes a birefringent material is incorporated into the optical system to cause the light to be focused at two different locations. FIG. 4 is a simplified lens diagram illustrating one example of such a system in which a birefringent component 302 (e.g., a lens) is positioned in the path of the collimated light that impinges on a second lens 304. Assuming that the incident light is un-polarized (or is linearly polarized with a polarization orientations that are uniformly distributed), the focus for the e-polarized light 306 and the focus for o-polarized light 308 are separated by a particular distance. A quad detector is positioned between the two foci at a location identified by 312 in FIG. 4. In such an arrangement, the quad detector receives the light with a first polarization (e.g., the e-polarized light) after focus, and the light with the second polarization (e.g., the o-polarized light) before focus. Therefore, the detected light includes both before- and after-focus components that are integrated on the quad detector. In one exemplary implementation, the quad detector is positioned at mid point between the two focal planes.

Figure 5:
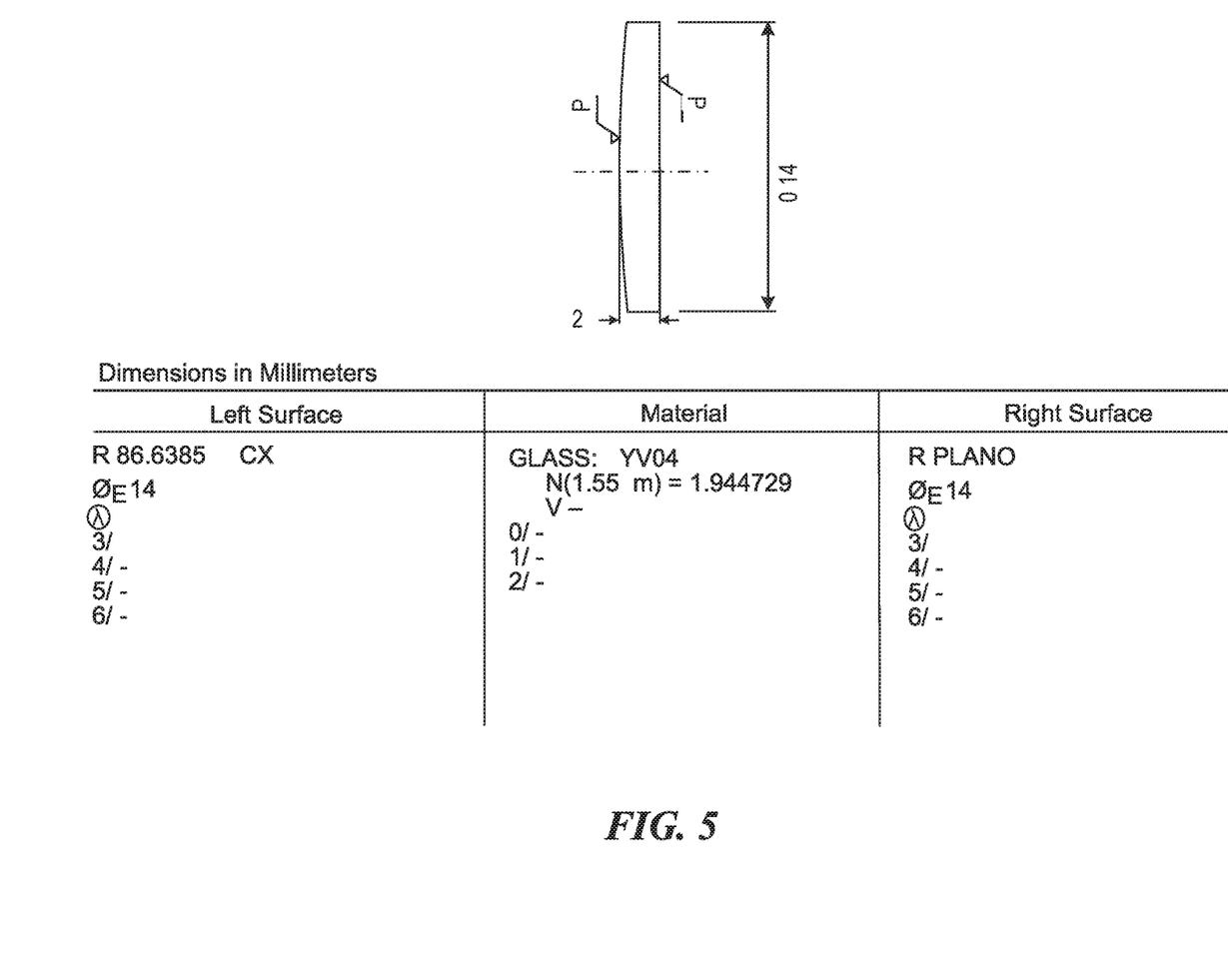
FIG. 5 is a diagram and a listing illustrating design parameters for a plano-convex birefringent lens in accordance with an example embodiment.

FIG. 5 illustrates a listing of the characteristics of an example birefringent plano-convex lens that can be used in the configuration of FIG. 4. An advantage of using a birefringent lens, as opposed to a birefringent parallel plate, is that such a lens provides a mechanism for correcting aberrations that are introduced into the optical system without requiring additional components, and without modifying other components of the optical system.

Figure 6:
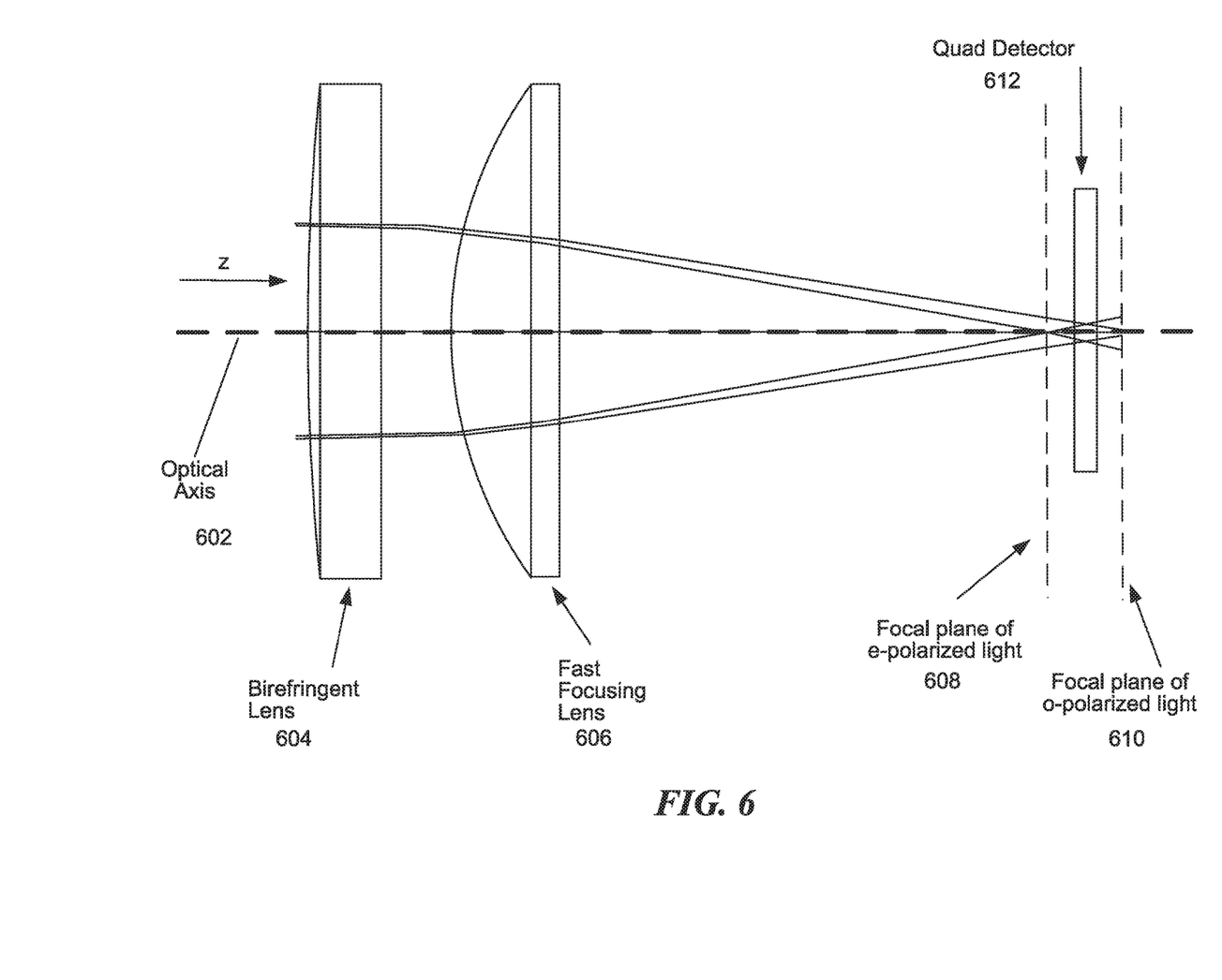
FIG. 6 is a lens diagram illustrating an optical system that uses a birefringent lens, a fast focusing lens and a quad detector to provide a tracking signal in accordance with an example embodiment.

FIG. 6 is a lens diagram illustrating an example optical detection system that uses a birefringent lens. The system of FIG. 6 includes a birefringent lens 604 that is positioned on the optical axis 602 (e.g., in the Z-direction) to receive the incoming un-polarized or randomly polarized light. The light incident on the birefringent lens 604 undergoes double refraction, and both the e-polarized and the o-polarized light that exit the birefringent lens 604 are incident upon the fast focusing lens 606 and are directed to their corresponding focal points. The e-polarized light that exits the fast focusing lens ultimately come to focus at a first focal plane 608 and o-polarized light that exits the fast focusing lens ultimately come to focus at a second focal plane 610. A quadrature detector 612 is positioned between the first and the second locations, and receives the defocused e-polarized and o-polarized light and produces a signal (e.g., a voltage) that is indicative of an alignment status of the optical system with respect to the beam of light that is being captured by the optical detection system.

When the quad detector is placed at the midpoint between the first and second locations, because of the random polarization of the incoming beam that is incident on the birefringent lens 604, the intensities of the e-polarized and o-polarized light detected by the quad detector are substantially equal. Using the symmetry principles described in connection with FIG. 3C, the proper algorithms can be devised to produce accurate tracking signals. For example, in the scenario shown in FIGS. 3A and 3C, the high intensity spot would appear in both quadrants A and D of the quad detector 612 of FIG. 6; a tracking algorithm that utilizes the difference between the signals of quadrants A and D can readily determine whether or not the optical detection system is truly misaligned with the intended target.

In the configuration of FIG. 6, the focal plane for the e-polarized light 608 is located between the fast focusing lens 606 and the quad detector 612, and the focal plane for the o-polarized light 610 is located behind the quad detector 612 such that the distance between the focal point corresponding to the o-polarized light and the fast focusing lens 606 is larger than the distance between the focal point corresponding to the e-polarized light and the fast focusing lens 606. The configuration of FIG. 6 advantageously allows both the birefringent lens 604 and the fast focusing lens 606 to be used to correct aberrations of the optical detection system. Thus, this configuration can be particularly useful when shaping of birefringent crystals for producing a single surface with a high radius of curvature is challenging or not feasible.

In one implementation of FIG. 6, the birefringent lens 604 has an f-number of 6 and a diameter of 14 millimeters (mm). In some embodiments, the birefringent lens 604 comprises birefringent material that includes Yttrium Vanadate ($YVO_4$), which is characterized by the following refractive index parameters: $\Delta n = n_O - n_E = 0.222$ (with index of refraction for ordinary ray, $n_O = 1.9929$, and index of refraction for extraordinary ray, $n_E = 2.2154$). Yttrium Vanadate, having a relatively high $\Delta n$, allows the birefringent lens to be designed with a larger radius of curvature, which alleviates some of the difficulties associated with shaping the birefringent material into a highly curved surface. Other birefringent materials considered are: Rutile, which is a mineral primarily composed of Titanium Oxide ($TiO_2$: $\Delta n = 0.296$, $n_O = 2.613$, $n_E = 2.909$). While Rutile has a large $\Delta n$, it may be suitable for only some implementations because it may be difficult to readily obtain the quantities needed for producing large optical components. Calcite ($CaCO_3$: $\Delta n = 0.17$, $n_O = 1.65$, $n_E = 1.486$) is another candidate that can be used in particular implementations; Calcite, however, is hydroscopic and thus may not have the suitable characteristics that are needed for certain UAV implementations. Lithium Niobate ($LiNbO_3$: $\Delta n = 0.09$, $n_O = 2.30$, $n_E = 2.21$) is another candidate, which has a low $\Delta n$ and thus may not provide an adequate degree of birefringence for certain applications. Tellurium Dioxide ($TeO_2$: $\Delta n = 0.118$, $n_O = 2.26$, $n_E = 2.142$) is another candidate that can be used in certain implementations. However, Tellurium Dioxide has an optical rotary effect, which may not be needed for all applications.

Figure 7:
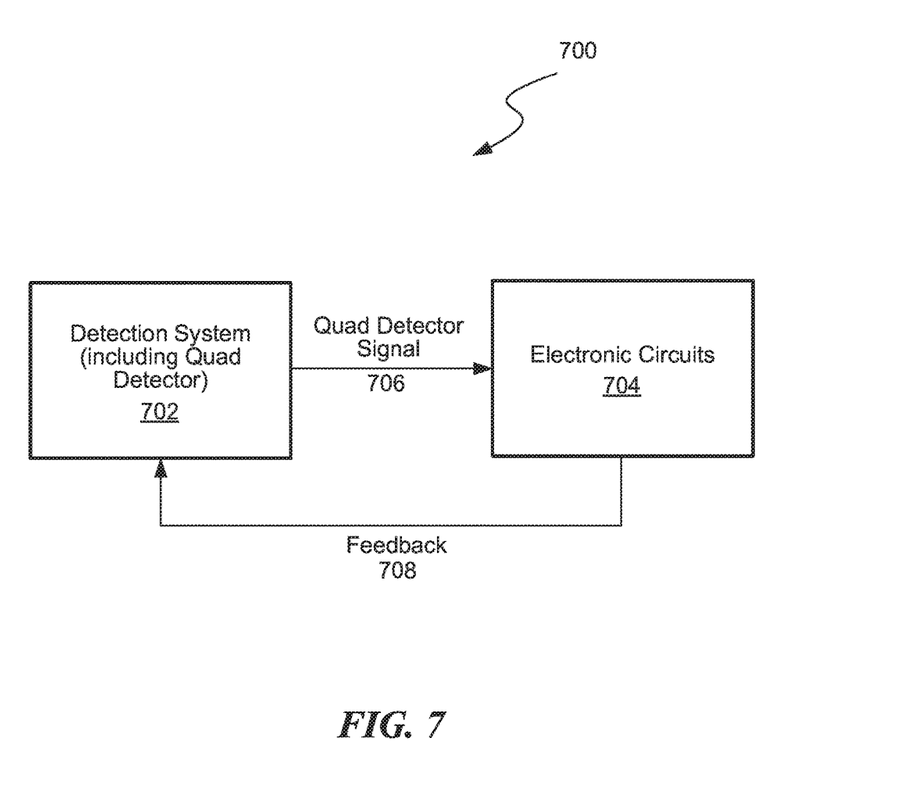
FIG. 7 is a block diagram illustrating an optical tracking system in accordance with an example embodiment.

FIG. 7 is a block diagram illustrating an example optical tracking system 700 in accordance with an example embodiment. In the simplified diagram of FIG. 7, the optical system 700 includes a detection system 702 that includes the quadrature detector and the associated components including the birefringent lens and the focusing lens. The output of the detection system 702 is coupled to electronic circuitry 704 that process the signals received from the optical system, including the quad detector signal 706, and provides feedback 708 to the detection system 702. In one example, the feedback 708 is a tracking signal that is indicative of the alignment of an optical system with respect to the beam that is received by the optical system. The feedback 708 can be used by other system components (not shown) to move, rotate, or otherwise displace one or more optical components, so as to adjust the alignment of the component(s) (or the system) with respect to the incoming beam. The processing that is conducted by the electronic circuits 704 can include determination of a centroid of light intensify pattern that is incident on the quadrature detector.

The electronic circuits can include discrete analog and/or digital components that are, for example, integrated as part of a printed circuit board, and receive and process the signals from the quad detector. In some implementations, the electronic circuits can include a microprocessor or a controller coupled to a non-transitory computer readable medium. A computer-readable medium may include removable and non-removable storage devices including, but not limited to, Read Only Memory (ROM), Random Access Memory (RAM), etc. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Further, the electronic circuits of FIG. 7 may be implemented as part of larger electronic system that also controls or operates other aspects or components of the optical detection system 700, the receiver/transmitter that is part of a ground-based system or an airborne vehicle. Alternatively, at least part of the electronic circuits 704 of FIG. 7 may be implemented as part of the detection system 702 that is shown in FIG. 7.

Figure 8:
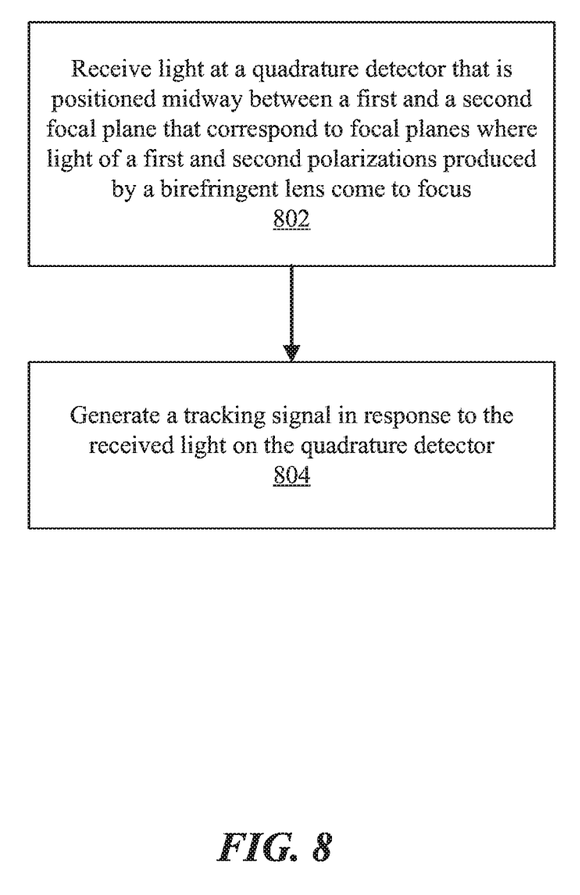
FIG. 8 is a block diagram illustrating a set of operations that can be carried out to generate a tracking signal in accordance with an example embodiment.

FIG. 8 is a block diagram illustrating a set of operations that can be carried out to produce a tracking signal in a free space optical communication system in accordance with an exemplary embodiment. At 802, light is received at a quadrature detector that is positioned midway between a first and a second focal plane. The first and the second focal planes correspond to locations where the light of a first and second polarizations, respectively, comes to focus. The light of the first and the second polarizations are produced by a birefringent lens that receives an incident beam of light, that causes light of the first and the second polarizations to exit the birefringent lens and enter a focusing lens. The focusing lens directs the light of the first and second polarizations to the first and the second focal planes, respectively. At 804, a tracking signal in response to the received light on the quadrature detector is generated.

In some embodiments, generating the tracking signal comprises processing an output of the quadrature detector using an electronic circuit to produce a signal that is indicative of an alignment status of an optical system that is coupled to the quadrature detector. In some embodiments, producing the output comprises determining a centroid of a spatial pattern of light that is incident on the quadrature detector. In some embodiments, receiving the light at a quadrature detector comprises simultaneously receiving defocused light with both the first polarization and the second polarization at the quadrature detector. In some embodiments, the beam of light incident on the birefringent lens is un-polarized light. In some embodiments, the light received at the quadrature detector comprises laser light that has propagated through a part of earth's atmosphere. In some embodiments, the above method for producing a tracking signal further includes updating the tracking signal at a rate of 100 KHz.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, devices, modules and systems, as well as in different sequential orders. Any disclosed implementation or embodiment may further be combined with any other disclosed implementation or embodiment.

What is claimed is:

1. An optical system for tracking incident light in a free space optical communication system, comprising:
    a lens comprising birefringent material that is positioned on an optical axis to receive the incident light and to produce light with a first polarization and light with a second polarization simultaneously in response to the incident light;
    a focusing lens positioned on the optical axis to receive the light with the first polarization and the light with the second polarization, to direct the light with the first polarization to a first focal location along the optical axis, and to direct the light with the second polarization to a second focal location along the optical axis; and
    a quad detector positioned between the first focal location and the second focal location to receive the light with the first polarization and the light with the second polarization simultaneously subsequent to exiting the focusing lens, and to produce an output indicative of an alignment of the optical system with the incident light received at the optical system.

2. The optical system of claim 1, wherein the birefringent material comprises Yttrium Vanadate (YVO4).

3. The optical system of claim 1, wherein the lens comprising birefringent material is a plano-convex lens and wherein the plane surface of the lens comprising birefringent material directly faces the focusing lens.

4. The optical system of claim 3, wherein the lens comprising birefringent material has an f-number of 6 and a diameter of 14 millimeters.

5. The optical system of claim 3, wherein the convex surface of the lens comprising birefringent material has a radius of curvature of 86 millimeters.

6. The optical system of claim 1, wherein the quad detector is positioned at a midpoint between the first focal location and the second focal location.

7. The optical system of claim 1, wherein the lens comprising birefringent material is shaped to correct an aberration of the optical system.

8. The optical system of claim 1, wherein the incident light received at the optical system comprises laser light having propagated through a part of earth's atmosphere.

9. The optical system of claim 1, further comprising an electronic circuit coupled to the quad detector to receive the output of the quad detector and to produce a tracking signal based on a detected intensity of the light that is incident on the quad detector.

10. The optical system of claim 9, wherein the tracking signal is produced based on a centroid of the detected intensity of the light that is incident on the quad detector.

11. The optical system of claim 9, wherein the tracking signal is a feedback signal that enables adjustment of the optical system's alignment with respect to the incident light received at the optical system.

12. The optical system of claim 1, wherein the incident light is un-polarized laser light.

13. A method for producing a tracking signal in a free space optical communication system, comprising:
    receiving light at a quad detector that is positioned midway between a first focal plane and a second focal plane, the first focal plane and the second focal plane corresponding to locations where light of a first polarization and light of a second polarization, respectively, come to focus, the light of the first polarization and the light of the second polarization having been produced simultaneously by a lens comprising birefringent material that receives an incident beam of light, causes the light of the first polarization and the light of the second polarization to exit the lens comprising birefringent material and enter a focusing lens that simultaneously directs the light of the first polarization and the light of the second polarization to the first focal plane and the second focal plane, respectively; and
    generating a tracking signal in response to the received light at the quad detector.

14. The method of claim 13, wherein generating the tracking signal comprises processing an output of the quad detector using an electronic circuit to produce a signal that is indicative of an alignment status of an optical system that is coupled to the quad detector.

15. The method of claim 14, wherein producing the output comprises determining a centroid of a spatial pattern of light that is incident on the quad detector.

16. The method of claim 13, wherein receiving the light at a quad detector comprises simultaneously receiving defocused light of the first polarization and defocused light of the second polarization at the quad detector.

17. The method of claim 13, wherein the beam of light incident on the lens comprising birefringent material is un-polarized light.

18. The method of claim 13, wherein the light received at the quad detector comprises laser light that has propagated through a part of earth's atmosphere.

19. The method of claim 13, further comprising updating the tracking signal at a rate of 100 KHz.

20. An optical detection system, comprising:
    a lens comprising a birefringent material and positioned to receive light on a first surface of the lens and produce light with a first polarization and light with a second polarization upon propagation of the received light through the birefringent material and upon exit from a second surface of the lens;
    a quad detector positioned to simultaneously receive the light with the first polarization and the light with the second polarization on one or more quadrants of the quad detector, the quad detector positioned such that an intensity of the light of the first polarization that impinges on the quad detector is equal to an intensity of the light of the second polarization that impinges on the quad detector.

* * * * *